(12) United States Patent
Lim et al.

(10) Patent No.: US 12,172,512 B2
(45) Date of Patent: Dec. 24, 2024

(54) FUEL CELL ELECTRIC VEHICLE

(71) Applicants: HYUNDAI MOTOR COMPANY, Seoul (KR); KIA CORPORATION, Seoul (KR)

(72) Inventors: Jun Young Lim, Incheon (KR); Seon Il Yoon, Yeoju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 347 days.

(21) Appl. No.: 17/891,711

(22) Filed: Aug. 19, 2022

(65) Prior Publication Data

US 2023/0202281 A1 Jun. 29, 2023

(30) Foreign Application Priority Data

Dec. 24, 2021 (KR) .......................... 10-2021-0187543

(51) Int. Cl.
*B60K 1/04* (2019.01)
*B60K 1/00* (2006.01)
(Continued)

(52) U.S. Cl.
CPC .............. *B60K 1/04* (2013.01); *B60K 15/063* (2013.01); *B60L 50/75* (2019.02); *B60L 58/40* (2019.02);
(Continued)

(58) Field of Classification Search
CPC .. B60K 1/04; B60K 15/063; B60K 2001/005; B60K 2001/0422; B60K 2001/0438;
(Continued)

(56) References Cited

U.S. PATENT DOCUMENTS 4,546,423 A * 10/1985 Seki ........................ H02M 7/48
363/58
5,412,268 A * 5/1995 Arnaud ..................... H02J 7/02
310/67 R
(Continued)

FOREIGN PATENT DOCUMENTS

JP 4109953 B2 4/2008
JP 2012111280 A 6/2012
(Continued)

*Primary Examiner* — Bryan A Evans
(74) *Attorney, Agent, or Firm* — Lempia Summerfield Katz LLC (57) ABSTRACT

A fuel cell electric vehicle includes: a motor, a fuel cell stack and an integrated controller, which are accommodated in a PE room provided in a front of a vehicle body; a battery assembly including a high-voltage battery electrically connected to the motor and the fuel cell stack, and a low-voltage battery for supplying electric power to a vehicle electrical part; an IDC that is mounted between the PE room and the battery assembly, and electrically connects the high-voltage battery to the motor and the fuel cell stack; and a plurality of hydrogen tanks that is mounted at a rear of the battery assembly and below the vehicle body. In particular, the battery assembly is mounted at a rear of the PE room and below the vehicle body, and the IDC converts power of the high-voltage battery to be supplied to the low-voltage battery.

12 Claims, 8 Drawing Sheets

(51) Int. Cl.

| | | |
|---|---|---|
| *B60K 15/063* | (2006.01) | |
| *B60L 50/75* | (2019.01) | |
| *B60L 58/40* | (2019.01) | |
| *H01M 8/04082* | (2016.01) | |
| *H01M 10/42* | (2006.01) | |
| *H01M 10/613* | (2014.01) | |
| *H01M 10/625* | (2014.01) | |
| *H01M 10/6562* | (2014.01) | |
| *H01M 16/00* | (2006.01) | |
| *H01M 50/204* | (2021.01) | |
| *H01M 50/24* | (2021.01) | |
| *H01M 50/249* | (2021.01) | |
| *H01M 50/267* | (2021.01) | |
| *B60K 15/03* | (2006.01) | |

(52) U.S. Cl.
CPC ..... *H01M 8/04201* (2013.01); *H01M 10/425* (2013.01); *H01M 10/613* (2015.04); *H01M 10/625* (2015.04); *H01M 10/6562* (2015.04); *H01M 16/006* (2013.01); *H01M 50/204* (2021.01); *H01M 50/24* (2021.01); *H01M 50/249* (2021.01); *H01M 50/267* (2021.01); *B60K 2001/005* (2013.01); *B60K 2001/0422* (2013.01); *B60K 2001/0438* (2013.01); *B60K 2015/03315* (2013.01); *B60K 2015/0634* (2013.01); *B60L 2210/10* (2013.01); *H01M 2010/4271* (2013.01); *H01M 2220/20* (2013.01); *H01M 2250/20* (2013.01)

(58) Field of Classification Search
CPC . B60K 2015/03315; B60K 2015/0634; H01M 10/613; H01M 10/625; H01M 10/6562; H01M 10/425; H01M 50/249; H01M 50/24; H01M 50/267; H01M 50/204; H01M 8/04201; H01M 16/006; H01M 2010/4271; H01M 2220/20; H01M 2250/20; B60L 58/40; B60L 50/75; B60L 2210/10

See application file for complete search history.

(56) References Cited

U.S. PATENT DOCUMENTS

| | | | | |
|---|---|---|---|---|
| 5,485,064 | A | * | 1/1996 | Arnaud ................ B60L 50/16 318/690 |
| 6,370,050 | B1 | * | 4/2002 | Peng ................ H02M 7/4807 363/17 |
| 7,559,389 | B2 | | 7/2009 | Yamashita |
| 7,854,282 | B2 | * | 12/2010 | Lee ..................... B60L 50/16 180/65.265 |
| 7,896,115 | B2 | * | 3/2011 | Ono ..................... B62D 25/20 180/68.3 |
| 9,073,426 | B2 | | 7/2015 | Tachikawa et al. |
| 11,260,761 | B2 | * | 3/2022 | Tanaka ............. H01M 8/04873 |
| 2006/0021805 | A1 | | 2/2006 | Yamashita |
| 2006/0289224 | A1 | | 12/2006 | Ono et al. |
| 2008/0149410 | A1 | * | 6/2008 | Yang ..................... B60K 1/04 180/291 |
| 2013/0056291 | A1 | * | 3/2013 | Hotta ..................... B60K 1/04 429/456 |
| 2013/0119757 | A1 | | 5/2013 | Tachikawa et al. |
| 2023/0178835 | A1 | | 6/2023 | Lim et al. |
| 2023/0202313 | A1 | | 6/2023 | Lim et al. |

FOREIGN PATENT DOCUMENTS

| | | |
|---|---|---|
| JP | 2013105616 A | 5/2013 |
| JP | 6515980 B1 | 4/2019 |
| KR | 20050020827 A | 3/2005 |
| KR | 101210095 B1 | 12/2012 |
| KR | 101219836 B1 | 1/2013 |
| KR | 102238042 B1 | 4/2021 |
| KR | 20230086854 A | 6/2023 |
| KR | 20230100288 A | 7/2023 |

* cited by examiner

FUEL CELL ELECTRIC VEHICLE

CROSS REFERENCE TO RELATED APPLICATION

The present application claims priority to and the benefit of Korean Patent Application No. 10-2021-0187543, filed Dec. 24, 2021, the entire contents of which are incorporated herein by reference.

BACKGROUND

Field

The present disclosure relates to a structure of an electric vehicle equipped with a fuel cell.

Description of the Related Art

The statements in this section merely provide background information related to the present disclosure and may not constitute prior art.

An electric vehicle equipped with a fuel cell uses the power generated from the fuel cell to drive a motor to obtain the driving power of the vehicle.

Since the fuel cell receives hydrogen to generate electricity and drives the motor with the electricity, a hydrogen tank capable of storing a large amount of hydrogen must be mounted on the vehicle. In addition, a battery capable of storing the electricity generated by the fuel cell or the motor and then supplying it to the motor is mounted on the vehicle.

As such, in order to mount a plurality of parts such as the fuel cell stack, the hydrogen tank, and the battery in the fuel cell electric vehicle, the interior space or the trunk space of the vehicle tends to be reduced. Accordingly, when the interior space or the trunk space of the vehicle is reduced, there is a problem in that the marketability of the vehicle is degraded.

The matters described as the background technology of the present disclosure are only for enhancing the understanding of the background of the present disclosure, and should not be taken as acknowledging that they correspond to the prior art already known to those of ordinary skill in the art.

SUMMARY

The present disclosure provides a fuel cell electric vehicle efficiently arranging a fuel cell stack, a hydrogen tank, a motor, a battery and the like to be mounted on the vehicle to increase the interior space and the trunk space of the vehicle as much as possible.

In one embodiment of the present disclosure, a fuel cell electric vehicle includes: a motor, a fuel cell stack and an integrated controller which are all accommodated in a PE room (namely, a powertrain room) provided in a front of a vehicle body; a battery assembly that is configured to include a high-voltage battery electrically connected to the motor and the fuel cell stack, and a low-voltage battery for supplying electric power to a vehicle electrical part, wherein the battery assembly is mounted at a rear of the PE room and below the vehicle body; an IDC that is mounted between the PE room and the battery assembly, electrically connects the high-voltage battery to the motor and the fuel cell stack, and converts power of the high-voltage battery to be supplied to the low-voltage battery; and a plurality of hydrogen tanks that is mounted at a rear of the battery assembly and below the vehicle body.

The battery assembly may be mounted outdoor below a first row seat of the vehicle body.

The battery assembly may accommodate the high-voltage battery and the low-voltage battery together in a watertight manner in a battery case, and the battery case may be fixed to a frame of the vehicle.

In the battery assembly, an inlet duct that passes through the battery case and the vehicle body and is connected to an interior may be formed to protrude upward from the battery case so as to cool the high-voltage battery by sucking air inside the vehicle; and an outlet duct that discharges the cooled air of the high-voltage battery to a lower side of the vehicle may be formed to extend to an outside of the battery case.

The inlet duct may be connected to a lower side of a driver seat in the first row; the outlet duct may extend from an upper side of the battery case to a side of the vehicle toward a passenger seat in the first row, and may be mounted so as to discharge air to the lower side of the vehicle body.

A high-voltage connector for connecting the high-voltage battery to the IDC, and a signal connector for connecting a BMS of the high-voltage battery to an outside may be provided on a front side of the battery case.

A low-voltage connector for drawing power from the low-voltage battery and supplying it to the vehicle electrical part may be provided at a rear side of the battery case.

The battery case may be provided with a plurality of coupling flanges, respectively, on both sides of the battery case so as to be coupled to a longitudinal member of the frame of the vehicle; a plurality of coupling brackets provided at the rear of the battery case so as to be coupled to a lateral member of the frame of the vehicle.

The plurality of hydrogen tanks may be arranged to form a single layer rearward from the battery assembly.

The plurality of hydrogen tanks may be fixed to a longitudinal member of the frame of the vehicle through a carriage configured to fix the hydrogen tanks.

The hydrogen tanks may be fixed to a lateral member of the frame of the vehicle by tank brackets that fix and support both ends of the hydrogen tanks.

A V2L for providing the power of the high-voltage battery to be used according to a user's convenience may be mounted between the PE room and the battery assembly.

The present disclosure can prevent the marketability decrease of a fuel cell electric vehicle by efficiently arranging a fuel cell stack, a hydrogen tank, a motor, a battery and the like to be mounted on the vehicle so that the interior space and the trunk space of the vehicle do not decrease as much as possible.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Specific structural or functional descriptions of the embodiments of the present disclosure disclosed in the present specification or application are only exemplified for the purpose of describing the embodiments according to the present disclosure, and the embodiments according to the present disclosure may be implemented in various forms, and should not be construed as being limited to the embodiments described in the present specification or application.

Since the embodiment according to the present disclosure can have various changes and can have various forms, specific embodiments are illustrated in the drawings and described in detail in the present specification or application. However, this is not intended to limit the embodiment according to the concept of the present disclosure with respect to a specific disclosed form, and should be understood to include all changes, equivalents or substitutes included in the spirit and scope of the present disclosure.

Terms such as first and/or second may be used to describe various components, but the components should not be limited by the terms. The above terms are used only for the purpose of distinguishing one component from another component, for example, without departing from the scope of the present disclosure, a first component may be referred to as a second component, and similarly the second component may also be referred to as the first component.

When a component is referred to as being "connected" or "contacted" to another component, it may be directly connected or contacted to the other component, but it should be understood that other components may exist in between. On the other hand, when it is mentioned that a certain component is "directly connected" or "directly contacted" to another component, it should be understood that no other component is present in the middle. Other expressions describing the relationship between components, such as "between" and "immediately between" or "neighboring to" and "directly adjacent to", etc., should be interpreted similarly.

The terms used herein are used only to describe specific embodiments, and are not intended to limit the present disclosure. The singular expression includes the plural expression unless the context clearly dictates otherwise. In the present specification, terms such as "comprise" or "have" are intended to designate that the described feature, number, step, operation, component, part, or a combination thereof exists, but it should be understood that it does not preclude the possibility of the existence or addition of one or more other features, numbers, steps, operations, components, parts, or combinations thereof.

When a component, device, element, or the like of the present disclosure is described as having a purpose or performing an operation, function, or the like, the component, device, or element should be considered herein as being "configured to" meet that purpose or to perform that operation or function.

Unless defined otherwise, all terms used herein, including technical and scientific terms, have the same meaning as commonly understood by one of ordinary skill in the art to which this present disclosure belongs. Terms such as those defined in commonly used dictionaries should be interpreted as having meanings consistent with the context of the related art, and unless explicitly defined in the present specification, they are not to be interpreted in an ideal or excessively formal meaning.

Hereinafter, the present disclosure is described in detail by describing some embodiments of the present disclosure with reference to the accompanying drawings. Like reference numerals in each figure indicate like components.

Referring to FIGS. 1 to 8, an embodiment of a fuel cell electric vehicle of the present disclosure is configured to include: a motor 3, a fuel cell stack 5 and an integrated controller 7 which are accommodated in a PE room 1 provided in a front of a vehicle body; a high-voltage battery 9 which is electrically connected to the motor 3 and the fuel cell stack 5; a low-voltage battery 11 for supplying electric power to a vehicle electrical part; a battery assembly 13 mounted at a rear of the PE room 1 and below the vehicle body; and an integrated DC-DC converter (IDC) 15 that is mounted between the PE room 1 and the battery assembly 13 electrically connects the high-voltage battery 9 to the motor 3 and the fuel cell stack 5, and converts the power of the high-voltage battery 9 to be supplied to the low-voltage battery 11. The fuel cell electric vehicle further includes: a plurality of hydrogen tanks 17 mounted at the rear of the battery assembly 13 and below the vehicle body.

Figure 1:
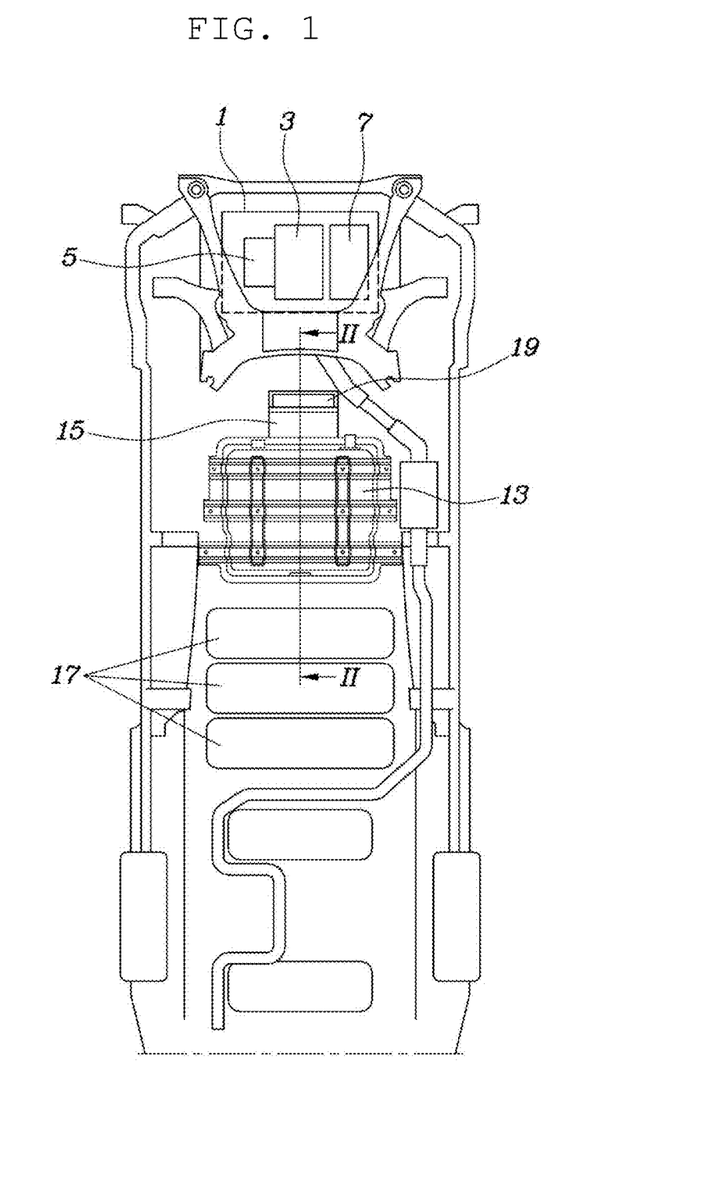
FIG. 1 is a view showing a structure of a fuel cell electric vehicle according to one embodiment of the present disclosure, as viewed from the bottom of the vehicle.

In one embodiment, the motor 3 directly generates the driving force of the vehicle, the fuel cell stack 5 generates electricity for driving the motor 3, and the integrated controller 7 controls the motor 3. In the electric vehicle, the motor 3, the fuel cell stack 5 and the integrated controller 7, etc. are arranged in the PE room 1 and at the front of the vehicle. In another embodiment, the battery assembly 13 and the hydrogen tanks 17 are sequentially arranged at the rear and below the vehicle body, and the IDC 15 electrically connecting the high-voltage battery 9 of the battery assembly 13 and the fuel cell stack 5 is arranged between the PE room 1 and the high-voltage battery 9.

Because it does not require for reducing the interior space and trunk space of the vehicle due to the vehicle mounting of the battery assembly 13 and the hydrogen tanks 17, the marketability of the vehicle can be effectively improved.

In addition, as described above, by disposing the IDC 15 between the PE room 1 and the battery assembly 13, the high-voltage cable among the high-voltage battery 9, the fuel cell stack 5 and the motor 3 can be connected in a straight line without being twisted or severely bent. Thus, as the length of the high-voltage cable becomes relatively short, it can contribute to cost and weight reduction of the vehicle.

Here, the IDC 15 is a combination of a bidirectional high-voltage DC-DC converter (BHDC) and a low-voltage DC-DC converter (LDC). The BHDC performs power conversion between the fuel cell stack 5 and the high-voltage battery 9, and the LDC performs power conversion so that the low-voltage battery 11 can be charged with the power of the high-voltage battery 9.

Meanwhile, in addition to the IDC 15, a vehicle to load (V2L) 19 that provides the power of the high-voltage battery 9 to be used outside the vehicle according to the user's convenience can be mounted between the PE room 1 and the battery assembly 13, and the V2L 19 may be integrally configured with the IDC 15.

Figure 2:
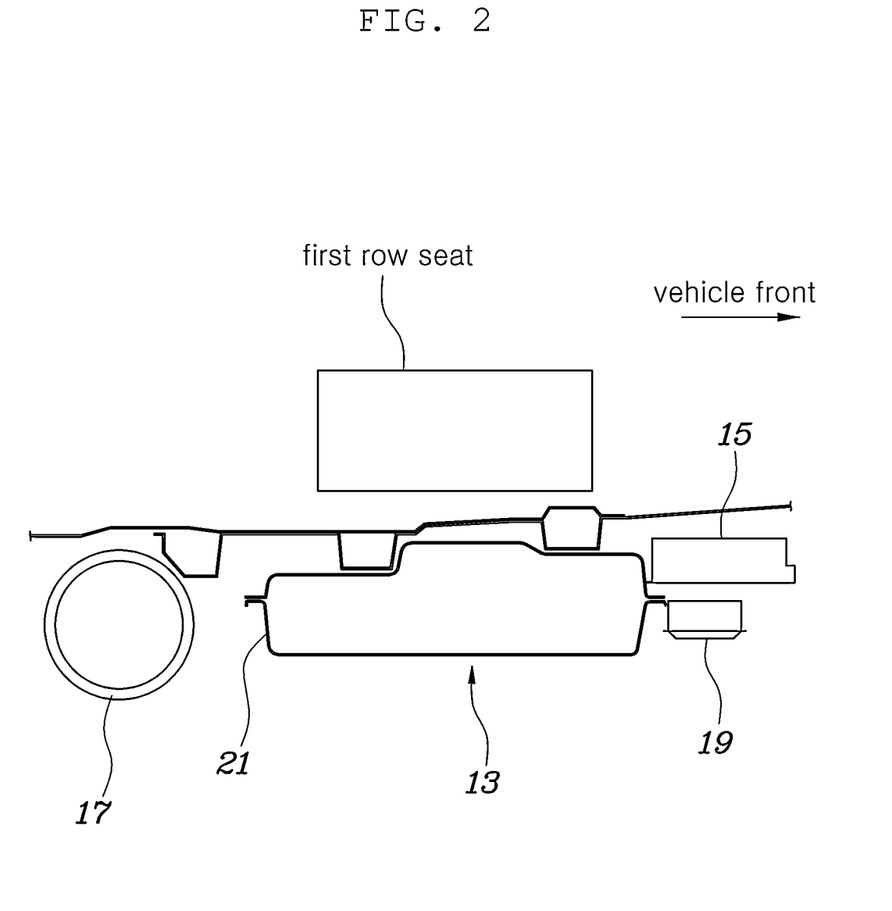
FIG. 2 is a sectional view taken along line II-II of FIG. 1.

As illustrated in FIG. 2, the battery assembly 13 is mounted outdoor below the first row seat of the vehicle body.

Accordingly, the battery assembly 13 is configured to accommodate the high-voltage battery 9 and the low-voltage battery 11 together in a watertight manner in a battery case 21 such that problems such as short-circuiting or leakage by moisture between the high-voltage battery 9 and the low-voltage battery 11 inside are inhibited or prevented.

Figure 3:
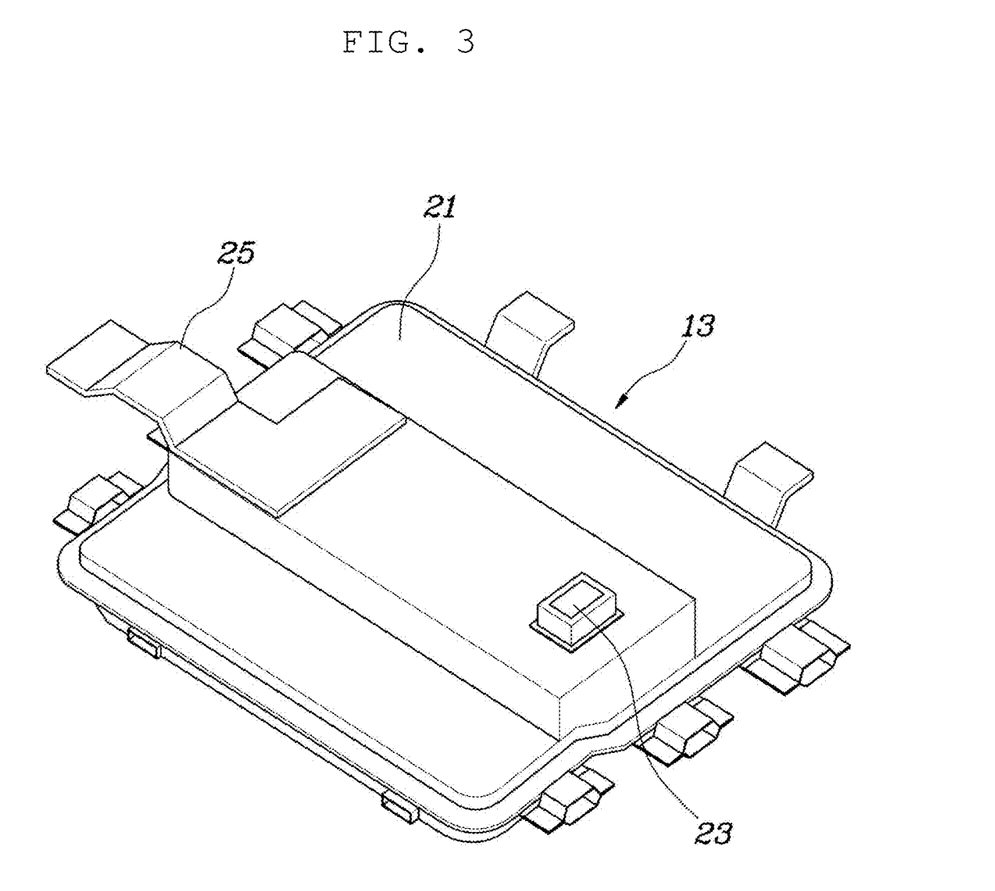
FIG. 3 is a view showing the battery assembly of FIG. 1.

In the battery assembly 13, an inlet duct 23 passing through the battery case 21 and the vehicle body and connected to the interior is formed to protrude upward from the battery case 21 so as to cool the high-voltage battery 9 by sucking the air inside the vehicle.

In addition, an outlet duct 25 for discharging the cooled air of the high-voltage battery 9 to the lower side of the vehicle is formed to extend to the outside of the battery case 21.

In one embodiment, except for the inlet duct 23 and the outlet duct 25, the battery case 21 is configured to provide sufficient sealing to prevent foreign substances or moisture from penetrating from the outside to the inside.

The inlet duct 23 is connected to the lower side of the driver seat in the first row to suck the air inside the vehicle to cool the high-voltage battery 9, and the outlet duct 25 extends from the upper side of the battery case 21 to the side of the vehicle toward the passenger seat in the first row, and is mounted so as to directly discharge the air to the lower side of the vehicle body.

The inlet duct 23 is provided on the upper side of the high-voltage battery 9 and communicates with the interior of the vehicle through the battery case 21 and the body panel.

Air introduced into the inlet duct 23 from the interior of the vehicle is branched from the upper side of the high-voltage battery 9 to each battery cell constituting the high voltage battery 9.

In another embodiment, the battery case 21 may have a shape that further protrudes upward from the position where the high-voltage battery 9 is mounted, and the inlet duct 23 may be formed to protrude more than the carpet surface inside the vehicle.

In other embodiment, the inlet duct 23 as described above is installed to protrude below the first row seat in order to secure a passenger's living space, and accordingly, the battery case 21 is installed outdoors under the first-row seat.

Figure 4:
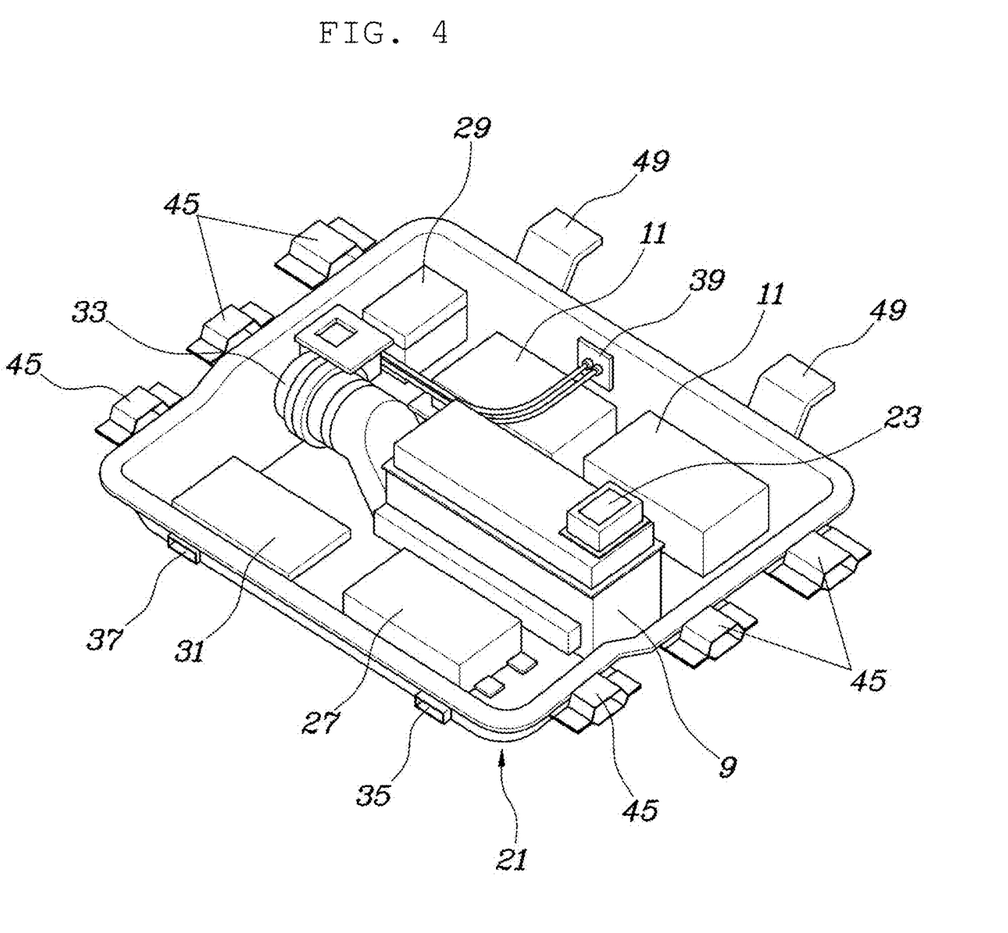
FIG. 4 is a view illustrating the inside of the battery assembly of FIG. 3.

For reference, examples of the parts accommodated inside the battery case 21 are illustrated in FIG. 4. The battery case 21 is provided with the high-voltage battery 9, the low-voltage battery 11, a power relay assembly 27 for the high-voltage battery 9, a power relay assembly (PRA) 29 for the low-voltage battery 11, a battery management system (BMS) 31 and a blower 33 that draws air into the inlet duct, cools the high-voltage battery 9, and then discharges the air to the outlet duct.

In one embodiment, a high-voltage connector 35 for connecting the high-voltage battery 9 to the IDC 15, and a signal connector 37 for connecting the BMS 31 of the high-voltage battery 9 to the outside are provided on the front side of the battery case 21.

In addition, a low-voltage connector 39 is provided on the rear side of the battery case 21 to draw the power from the low-voltage battery 11 and supply it to the vehicle electrical part.

The low-voltage battery 11 can provide a voltage of, for example, 12V to the electrical part, and the electrical part refers to, for example, various electric lights and audio components of a vehicle.

Figure 5:
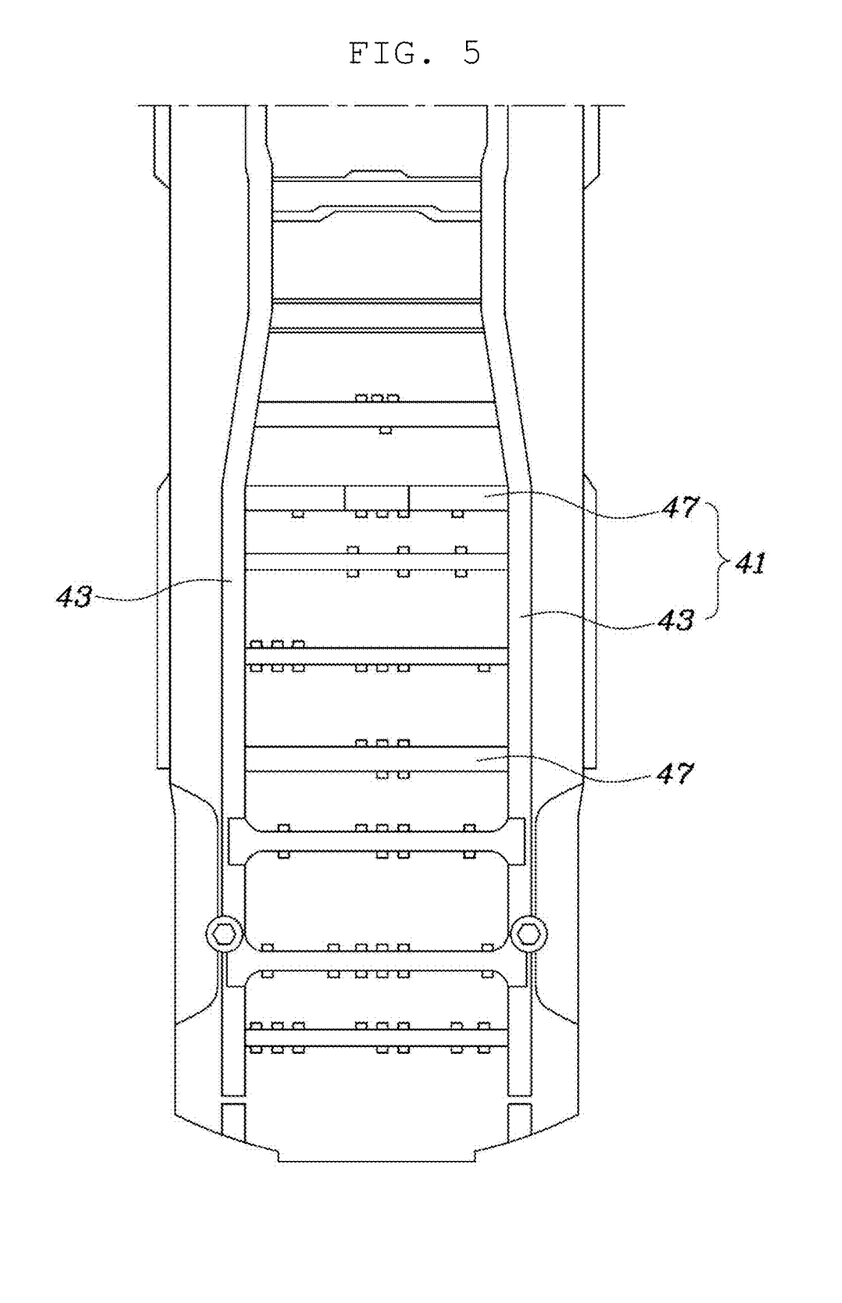
FIG. 5 is a view illustrating a vehicle frame under the vehicle of FIG. 1.

The battery case 21 is firmly fixed to a frame 41 of the vehicle.

Figure 6:
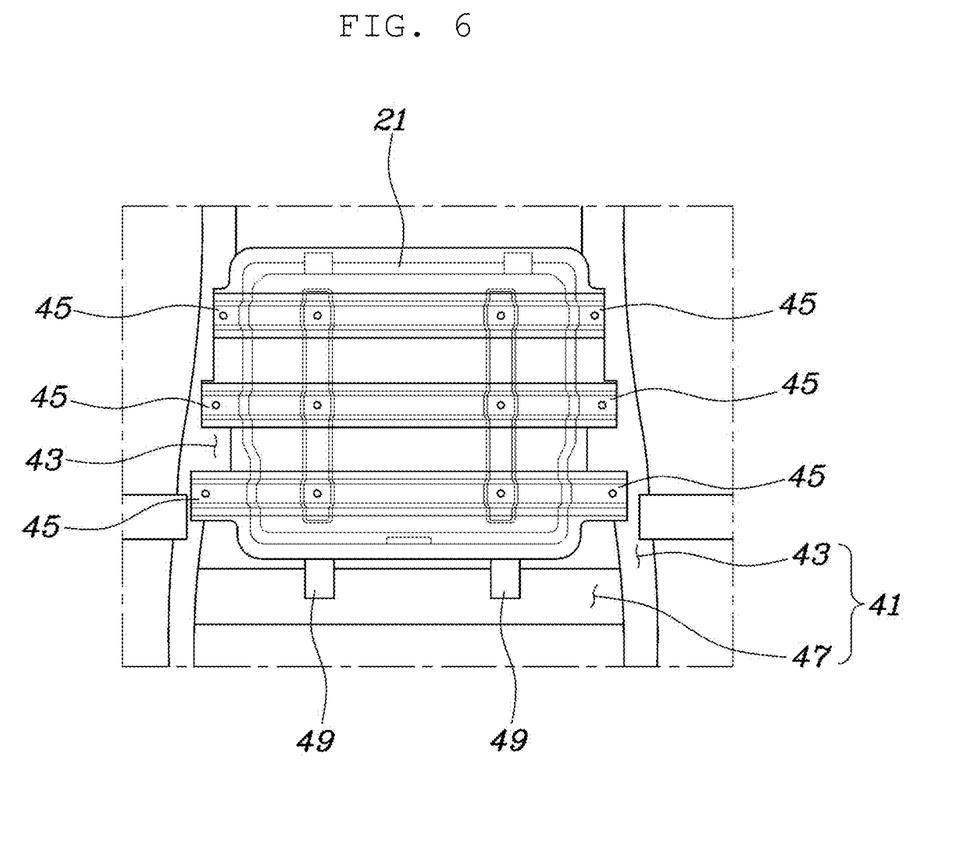
FIG. 6 is a view showing in detail a state in which a battery assembly is mounted on a vehicle frame in one embodiment of the present disclosure.

In one embodiment, the battery case 21 is provided with a plurality of coupling flanges 45, respectively, on both sides of the battery case 21 so as to be coupled to a longitudinal member 43 of the frame 41 of the vehicle. In addition, a plurality of coupling brackets 49 is provided at the rear of the battery case 21 so as to be coupled to a lateral member 47 of the frame 41 of the vehicle.

For example, as shown in FIG. 6, a total of six coupling flanges 45 are coupled to the longitudinal member 43 of the frame 41 from the side of the battery case 21, and a total of two coupling brackets 49 are coupled to the lateral member 47 of the frame 41 from the rear of the battery case 21, so that the battery case 21 is fixed to the frame 41 of the vehicle in a very solid state.

The plurality of hydrogen tanks 17 is arranged to form a single layer below the vehicle body rearward from the battery assembly 13.

In other words, by arranging the plurality of hydrogen tanks 17 to form the single layer at the lower side of the vehicle so as not to occupy the trunk space as in the conventional art, it is possible to prevent a marketability decrease due to a reduction in the interior space or trunk space of the vehicle.

Figure 7:
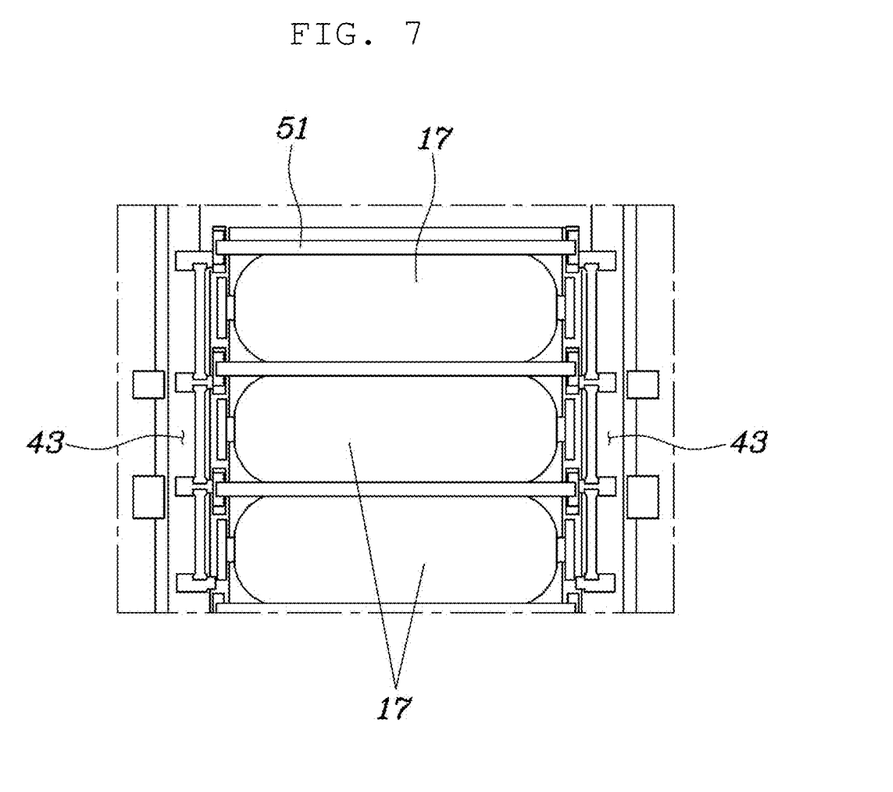
FIG. 7 is a view illustrating a state in which a hydrogen tank is mounted on a vehicle frame through a carriage in one embodiment of the present disclosure.

The plurality of hydrogen tanks 17 may be fixed to the longitudinal member 43 of the frame 41 of the vehicle through a carriage 51 configured to fix the hydrogen tanks 17 as illustrated in FIG. 7.

Figure 8:
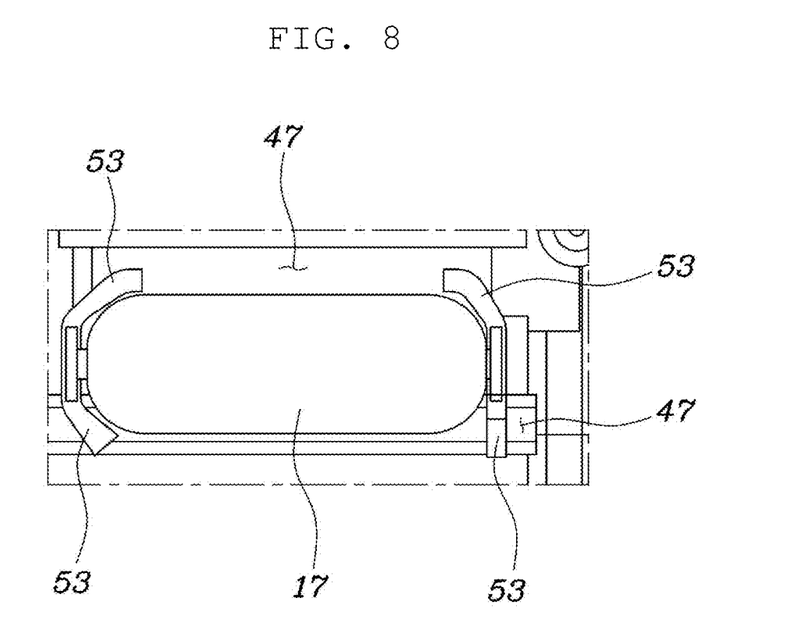
FIG. 8 is a view illustrating a state in which a hydrogen tank is mounted on a vehicle frame through a tank bracket in one embodiment of the present disclosure.

In addition, unlike the above, as shown in FIG. 8, the hydrogen tank 17 may be fixed to the lateral member 47 of the frame 41 of the vehicle by tank brackets 53 that fix and support both ends of the hydrogen tanks 17.

Although the present disclosure has been shown and described with reference to specific embodiments, it should be apparent to those of ordinary skill in the art that the present disclosure can be variously improved and changed without departing from the technical spirit of the present disclosure.

What is claimed is:

1. A fuel cell electric vehicle comprising:
   a motor, a fuel cell stack and an integrated controller, which are accommodated in a room provided in a front of a vehicle body;
   a battery assembly comprising:
     a high-voltage battery electrically connected to the motor and the fuel cell stack, and
     a low-voltage battery configured to supply electric power to a vehicle electrical part and mounted at a rear of the room and below the vehicle body;
   an integrated DC-DC converter (IDC) mounted between the room and the battery assembly, and configured to:
     electrically connect the high-voltage battery to the motor and the fuel cell stack, and
     convert power of the high-voltage battery to be supplied to the low-voltage battery; and
   a plurality of hydrogen tanks mounted at a rear of the battery assembly and below the vehicle body.

2. The fuel cell electric vehicle according to claim 1, wherein the battery assembly is mounted outdoor below a first row seat of the vehicle body.

3. The fuel cell electric vehicle according to claim 2, wherein:

the battery assembly accommodates the high-voltage battery and the low-voltage battery together in a watertight manner in a battery case; and the battery case is fixed to a frame of the vehicle.

4. The fuel cell electric vehicle according to claim 3, wherein in the battery assembly, an inlet duct that passes through the battery case and the vehicle body and is connected to an interior is formed to protrude upward from the battery case so as to cool the high-voltage battery by sucking air inside the vehicle; and an outlet duct that discharges the cooled air of the high-voltage battery to a lower side of the vehicle is formed to extend to an outside of the battery case.

5. The fuel cell electric vehicle according to claim 4, wherein:

the inlet duct is connected to a lower side of a driver seat in the first row; and the outlet duct extends from an upper side of the battery case to a side of the vehicle toward a passenger seat in the first row, and is mounted so as to discharge air to the lower side of the vehicle body.

6. The fuel cell electric vehicle according to claim 3, wherein a high-voltage connector for connecting the high-voltage battery to the IDC, and a signal connector for connecting a battery management system (BMS) of the high-voltage battery to an outside are provided on a front side of the battery case.

7. The fuel cell electric vehicle according to claim 3, wherein a low-voltage connector for drawing power from the low-voltage battery and supplying it to the vehicle electrical part is provided at a rear side of the battery case.

8. The fuel cell electric vehicle according to claim 3, wherein the battery case is provided with a plurality of coupling flanges, respectively, on sides of the battery case so as to be coupled to a longitudinal member of the frame of the vehicle; and wherein a plurality of coupling brackets is provided at the rear of the battery case so as to be coupled to a lateral member of the frame of the vehicle.

9. The fuel cell electric vehicle according to claim 1, wherein the plurality of hydrogen tanks is arranged to form a single layer rearward from the battery assembly.

10. The fuel cell electric vehicle according to claim 9, wherein the plurality of hydrogen tanks is fixed to a longitudinal member of a frame of the vehicle through a carriage configured to fix the hydrogen tanks.

11. The fuel cell electric vehicle according to claim 9, wherein the plurality of hydrogen tanks is fixed to a lateral member of a frame of the vehicle by tank brackets that fix and support ends of the plurality of hydrogen tanks.

12. The fuel cell electric vehicle according to claim 1, wherein a vehicle to load (V2L) for providing the power of the high-voltage battery to be used according to a user's convenience is mounted between the room and the battery assembly.

* * * * *